April 26, 1966

J. A. BRAZEE 3,248,646

LOCATION OF CABLE FAULTS BY COMPARING A
SECTION OF THE FAULTED CABLE WITH
A PART OF THE SECTION

Filed July 19, 1962

INVENTOR.
JOHN A. BRAZEE
BY

*Blair and Buckles*
ATTORNEYS.

April 26, 1966 J. A. BRAZEE 3,248,646
LOCATION OF CABLE FAULTS BY COMPARING A
SECTION OF THE FAULTED CABLE WITH
A PART OF THE SECTION
Filed July 19, 1962 4 Sheets-Sheet 2

INVENTOR.
JOHN A. BRAZEE
BY
*Blair and Buckles*
ATTORNEYS.

April 26, 1966

J. A. BRAZEE 3,248,646

LOCATION OF CABLE FAULTS BY COMPARING A
SECTION OF THE FAULTED CABLE WITH
A PART OF THE SECTION

Filed July 19, 1962

INVENTOR.
JOHN A. BRAZEE

BY

*Blair and Buckles*
ATTORNEYS.

April 26, 1966

J. A. BRAZEE 3,248,646

LOCATION OF CABLE FAULTS BY COMPARING A
SECTION OF THE FAULTED CABLE WITH
A PART OF THE SECTION

Filed July 19, 1962

INVENTOR.
JOHN A. BRAZEE

BY

*Blair and Buckles*

ATTORNEYS.

3,248,646
LOCATION OF CABLE FAULTS BY COMPARING A SECTION OF THE FAULTED CABLE WITH A PART OF THE SECTION
John A. Brazee, Wallingford, Conn., assignor to Whitney Blake Company, New Haven, Conn.
Filed July 19, 1962, Ser. No. 210,960
7 Claims. (Cl. 324—52)

This application is a continuation-in-part of the pending application entitled, "Method and Apparatus for Locating Cable Faults," Serial Number 784,709, filed January 2, 1959, and assigned to the assignee of this application.

This invention relates to an improved method and apparatus for locating faults in electrical cables and the like. More particularly, it relates to a simple, easy-to-use method and apparatus capable of accurate location of shorts and opens by comparing the impedance of the entire faulted line to the impedance of the section of line between the point of measurement and the fault.

The location of a split pair, wherein paired conductors become intermixed, also is readily determined with the methods and apparatus of the invention.

It is well known that the resistance of an electrical conductor varies in direct proportion to its length. Further, the capacitance between the conductor and another conductor in the same cable varies in the same manner, since the spacing between the two conductors, indeed between all other conductors in the cable, is constant throughout its length. Accordingly, it is possible to locate a fault in a conductor by comparing the resistance or capacitance of the section between the fault and one end of the conductor with a standard impedance of known relationship to the length of the line. Ordinarily, capacitance measurements are used for location of breaks and resistance measurements for the location of short circuits; and the measurements are made with bridge circuits which compare the impedances involved in a well-known manner.

A popular system for detecting short circuits is the "Murray loop," in which the resistance between the fault and one end of the faulted line is compared with the resistance of another line in the same cable. The use of this system involves a basic assumption, viz., that the resistance of the standard, i.e., the other line, bears the same relationship to line length as the resistance of the measured section of the faulted line. However, the cross sections of wires of the same gauge vary within relatively wide tolerance limits, and even conductors in the same cable exhibit a relatively wide range of resistance per unit length, since they are drawn through different dies. Furthermore, it may not be feasible to use, as a standard, a line in the same cable, and if another line paralleling the faulted conductor is used, its temperature may be different, thereby adding a further element of error. Also, in many cases it is desirable to make the measurements at a test station in a telephone exchange or the like, from which lead wires connect the faulted cable to the point of measurement. This requires additional computation to eliminate the effect of lead resistance.

A more accurate method of locating shorts is the so-called "Three Varley Method." Three measurements are made of various combinations of the faulted conductor, the conductor to which it is shorted and another conductor. By subtraction and division of the results of the various measurements, one may arrive at the ratio of the resistance from the point of measurement to the fault to the entire resistance of the faulted line. The distance to the fault is then computed by multiplying this ratio by the total length of the line. Since the resistance per unit length of a conductor does not vary appreciably along the length thereof, the inaccuracies of the "Murray loop" are largely eliminated. However, fault location is desirably performed by relatively unskilled labor, and it has found that numerous errors have resulted from the several measurements required and the computations which must be made for a determination of the distance of the fault. Another troublesome factor stems from the necessity of a balance of the bridge circuit; sometimes balance cannot be obtained, requiring a change in the connections for the particular measurement.

The location of breaks has heretofore been accomplished by comparing the capacitance between a section of the faulted conductor and another conductor with the capacitance between another pair of conductors in the same cable. As with resistance, the capacitances between pairs of conductors in a cable may vary rather widely, and therefore these prior systems have been subject to large inaccuracies. It should be noted that an error of as little as a hundred feet in the measured location of a fault in an armored cable suspended on poles or buried in the ground can result in considerable additional expenditure in arriving at its actual location and correction.

Accordingly, it is a principal object of my invention to provide an improved method and apparatus for accurate location of faults in electrical conductors. It is another object of my invention to provide a method and apparatus of the above character capable of locating both short and open circuit faults. Yet another object is to provide an improved method and apparatus of the above character for accurate location of a split pair in a multiple-pair electrical conductor. A further object of the present invention is to provide a method and apparatus of the above character requiring a minimum number of simple measurements and computations, and thereby lending itself to expeditious operation by unskilled personnel. A still further object of the invention is to provide a method and apparatus of the above character capable of fault location in a line comprising serially connected conductors of different sizes. Yet another object of the invention is to provide apparatus of the above character having high precision and yet readily constructed of relatively low cost components. Other objects of the invention will in part be obvious and will in part appear hereinafter.

The invention accordingly comprises the several steps and the relation of one or more of such steps with respect to each of the others, and the apparatus embodying the features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description in connection with the accompanying drawings, in which.

In general, my invention operates to locate a fault by comparing an impedance of the entire faulted line with the impedance of a section between the fault and one end of the line. The ratio between these impedances is the fractional distance of the fault from the end of the line at which the measurements are made. Where the fault is a short circuit, the impedance utilized is the resistance of the line, and where a break or open circuit is to be located, the capacitance between the line and another conductor is utilized. The measurements involved require the balancing of a simple bridge circuit by moving the tap of a potentiometer forming two arms of a simple bridge circuit. The faulted conductors and other conductors form the other arms. The present invention requires but two measurements. One of these determines the ratio of the impedance of the section between the test set and the fault to the sum of the impedances of the entire faulted line and another line. The other determines a ratio relating the impedance of the section in question to another impedance including that of the other line. By simple arithmetic calculation involving the two ratios, one may arrive at a third ratio relating the impedance of the section in question to that of the entire faulted line.

Figure 2:
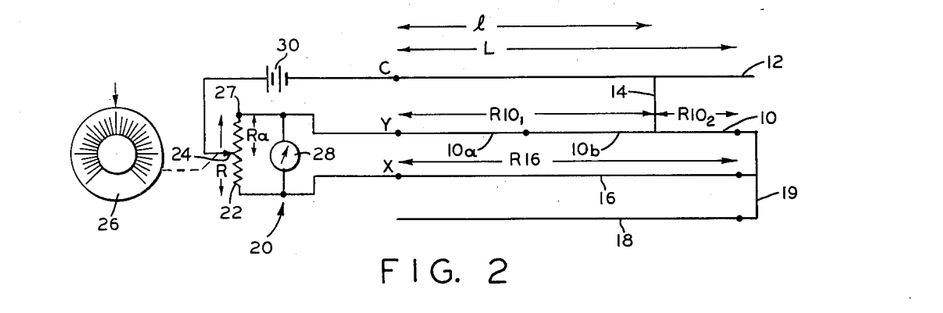
FIGURES 2 and 3 are simplified schematic circuit diagrams showing the operation of the test set of FIGURE 1 in locating a short circuit.
Figure 3:
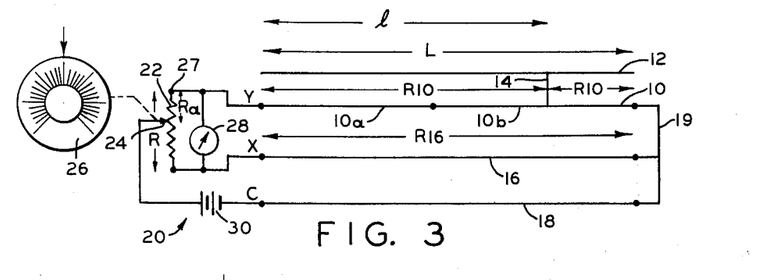

Turning now to FIGURES 2 and 3, a faulted line 10 is short circuited to another conductor 12 as indicated at 14. Conductor 12 may be another line in the same cable as line 10 or in another cable, or it may be the cable armor or sheath or even the ground itself, and thus the term "Conductor," as used herein and in the claims, is not restricted to any particular form of electrically conducting medium. Furthermore, the term "short circuit" includes high resistance paths betwen conductors, since these, as well as low resistance connections, are susceptible of accurate location by the system to be described. Two more conductors, 16 and 18, extend along the length L of the faulted line 10, and a jumper 19 is used to connect the far ends of line 10 and conductors 16 and 18. The present invention is adapted to determine the distance $l$ from one end of the line 10 to the fault 14 in a manner to be described.

More particularly, as shown in FIGURES 2 and 3, a test set generally indicated at 20 includes a potentiometer 22 with a tap 24. The tap is mechanically linked to a dial 26 calibrated in terms of the ratio, $R_a/R$, of the resistance $R_a$ to the tap 24 and one end 27 of the potentiometer 22 to the entire resistance R of the potentiometer. A sensitive current or voltmeter 28 is connected across potentiometer 22 between a pair of terminals X and Y. The test set is completed for the measurements of FIGURES 2 and 3 by a battery 30 connected between the tap 24 and a third terminal C.

Operation of the test set 20 in the location of the fault 14 in line 10 is as follows:

A first measurement is made by connecting the apparatus as shown in FIGURE 3 with the Y and X terminals connected to line 10 and conductor 16 and the C terminal connected to conductor 18. The resulting bridge circuit includes the portions of the potentiometer 22 on either side of the tap 24 as two of its arms; and the line 10 and conductor 16 are the other two arms. The bridge is brought to balance as indicated by a null reading of the meter 28, and the reading of the dial 26 provides the information, $$\frac{Ra}{R} = \frac{R10_1 + R10_2}{R10_1 + R10_2 + R16} = P \quad (1)$$

where,

P designates the value of the ratio of $R_a/R$ as determined with one measurement according to the invention, $R10_1$ is the resistance of the section of line 10 lying between the Y terminal and the fault 14, $R10_2$ is the resistance of the remainder of the line 10, and $R16$ is the resistance of the conductor 16.

The C terminal of the test set 20 is then moved to the conductor 12 for a second measurement, as shown in FIGURE 2. With this connection, two arms of the bridge are, as before, the two portions of the potentiometer 22 on either side of the tap 24. One of the remaining arms consists of the resistance $R10_1$, and the other, resistances $R10_2$ and $R16$. When the bridge is balanced, dial 26 indicates, $$\frac{Ra}{R} = \frac{R10_1}{R10_1 + R10_2 + R16} = K \quad (2)$$

where,

K designates the value of the ratio of $R_a/R$ as determined with another measurement according to the invention, Thus, $$\frac{K}{P} = \frac{R10_1}{R10_1 + R10_2} = \frac{l}{L} \quad (3)$$

The latter fraction, $l/L$, is the fractional distance of the fault 14 from the near end of the line 10 connected to the test set 20. Multiplication of this fraction by the known length L of the faulted line gives the actual distance of the fault 14 in units of length.

It is seen that only two readings on the test set 20 are required for location of the fault 14. These readings are easily taken from the dial 26, and between readings only one connection, that of the C terminal, is changed. Furthermore, the computation required to convert the readings into the location of the fault is elementary in nature and easily handled by personnel having minimum training.

In some cases, the faulted line 10 may comprise two conductors 10a and 10b (FIGURES 2 and 3) of different sizes or gauges. In that event, the line would be termed a mixed gauge line having two mixed gauges as shown. The location of a fault in a mixed gauge line, by my invention, involves the same measurements as those described above for a single gauge line. The connections and readings taken are exactly the same. However, the computation is somewhat different. If section 10a closest to the test set 20 were shorted, the measured value of K, as determined above, would be less than, $$\frac{L_1}{L_1 + ML_2} \quad (4)$$

where, $L_1$ is the length of the near section 10a,
$L_2$ is the length of the far section 10b, and
M is the nominal resistance per unit length for the gauge size of the second section divided by the nominal resistance per unit length of the gauge size in the first section, and the distance to the fault from the test set 20 would be, $$\left(\frac{K}{P}\right)(L_1+ML_2) \qquad (5)$$

In the example shown, fault 14 is in the second section 10b, and this would be indicated by a value of K greater than $$\frac{L_1}{L_1+ML_2}$$

The distance to the fault would be given by, $$\left(\frac{K}{P}\right)\left(\frac{1}{M}\right)(L_1+ML_2)-\frac{L_1}{M}+L_1 \qquad (6)$$

Again, the computations required are simpler than those used in other fault locating systems capable of reasonable accuracy.

Similar expressions may be derived for location of faults in lines having any number of mixed gauges. For maximum accuracy, however, I prefer to determine first the section containing the fault from Expressions 4, or similar expressions for greater numbers of mixed gauges, then disconnect the section in order to make a direct measurement on it.

Figure 4:
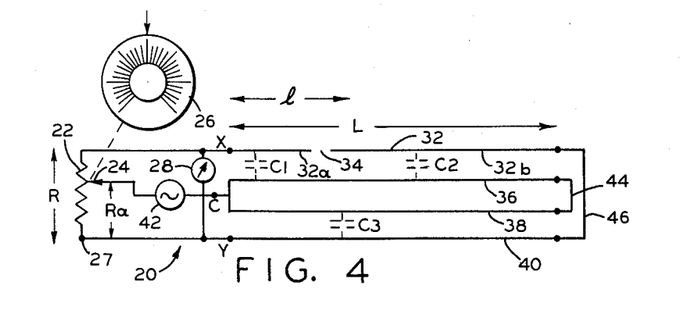
FIGURES 4 and 5 are simplified schematic circuit diagrams showing the operation of the test set of FIGURE 1 in locating an open circuit.
Figure 5:
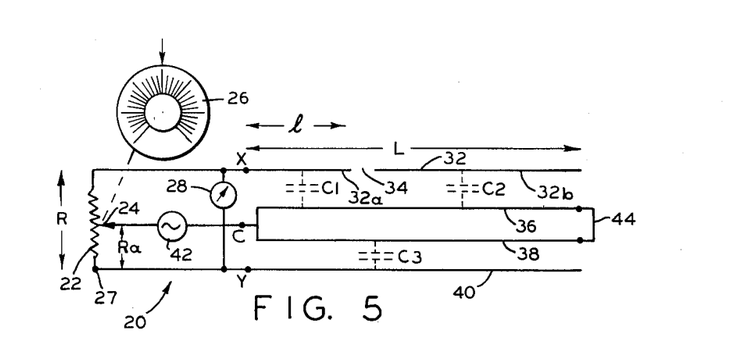

In FIGURES 4 and 5, I have illustrated a line 32 having a fault 34 in the form of a break or open circuit to be located by use of the test set 20. Conductors 36, 38 and 40 extending between the ends of the faulted line 32 are also used in the required measurements. The test set 20 utilizes an alternating current generator illustratively indicated at 42 in place of the battery 30 of FIGURES 2 and 3 in order to make use of the capacitances between certain of the conductors in determining the distance $l$ to the fault 34.

More particularly, between conductor 36 and the near section 32a of the line 32 there is a capacitance C1, and between conductor 36 and the far section 32b of the faulted line, there is a capacitance C2. Further, there is a capacitance C3 between conductors 38 and 40. The X and Y terminals of the test set 20 are connected to section 32a and conductor 40, respectively, and terminal C is connected to conductors 36 and 38. A jumper 44 connects the ends of conductors 36 and 38 remote from the test set, and for one of the measurement (FIGURE 4), a second jumper 46 connects the far ends of line 32 and conductor 40. Thus, in FIGURE 4, a bridge circuit is formed having as two of its arms the portions of the potentiometer 22 on either side of the tap 24. One of the other arms comprises the capacitance C1 and the other includes capacitances C2 and C3. Accordingly, when the bridge is brought to balance as indicated by the meter 28, the dial 26 indicates, $$\frac{R_a}{R}=\frac{C1}{C1+C2+C3}=K \qquad (7)$$

Jumper 46 is then removed and a second measurement taken with the connections shown in FIGURE 5. With the bridge at balance, $$\frac{R_a}{R}=\frac{C1}{C1+C3}=P \qquad (8)$$

It can be shown that, $$\frac{PK}{PK+(P-K)}=\frac{C1}{C1+C2} \qquad (9)$$

The right-hand side of Equation 9 is the ratio of the capacitance of section 32a of the faulted line 32 to the entire capacitance between the line and conductor 36 and is therefore equal to the fractional distance, $l/L$, of the fault 34 from the near end of line 32. Accordingly, one may determine the actual distance to the fault 34 by performing the arithmetic operations on the measured values of K and P indicated in the left-hand side of Equation 9 and multiplying the resulting fraction by the total length L of the line 32.

The above method of locating breaks in lines is substantially more accurate than prior methods, since the capacitances C1 and C2 are determined by the insulation between the line 32 and the conductor 36. The insulation around a given conductor is essentially constant over the length thereof, and therefore the capacitance between two such conductors will vary almost exactly linearly with the distance. Accordingly, the fraction, $$\frac{C1}{C1+C2}$$

of the total capacitance ($C1+C2$) is an accurate indication of the distance to the fault 34. On the other hand, prior methods have utilized the nominal capacitance per unit length between conductors or have compared various capacitances along the faulted conductor with the capacitance between two conductors of an entirely different pair. Because of the variation in conductor insulation permitted by the tolerance ranges, considerable inaccuracies resulted from these prior sytems.

The two measurements described above may also be used in locating a break in a mixed capacitance line, i.e., a line having segments of different capacitances. For example, if the line comprises segments of two different capacitances, and the break is in the near segment connected to the test set 20, the measured value of K will be less than, $$\frac{L1}{L1+NL2}$$

where, $L_1$ is the length of the near segment,
$L_2$ is the length of the remote segment, and
N is the nominal capacitance per unit length between the line 32 and conductor 36 in the near segment divided by the nominal capacitance between the line and conductor 36 in the remote segment.

Where the break is in the near segment, the distance thereof from the test set is given by, $$\frac{PK}{PK+P-K}[L_1+NL_2] \qquad (11)$$

If the break is in the remote segment, the distance is given by, $$\frac{1}{N}\left(\frac{PK}{PK+P-K}\right)(L_1+NL_2)-\frac{L}{N}+L \qquad (12)$$

For maximum accuracy, it is again advisable to locate the section in which the break has occurred and then isolate this section for further measurement in the manner described above for a one gauge line. The jumper connections 44 and 46 at the remote ends of the conductors may, of course, be made by latching type relays energized from the end at which the test set measurements are made.

Figure 1:
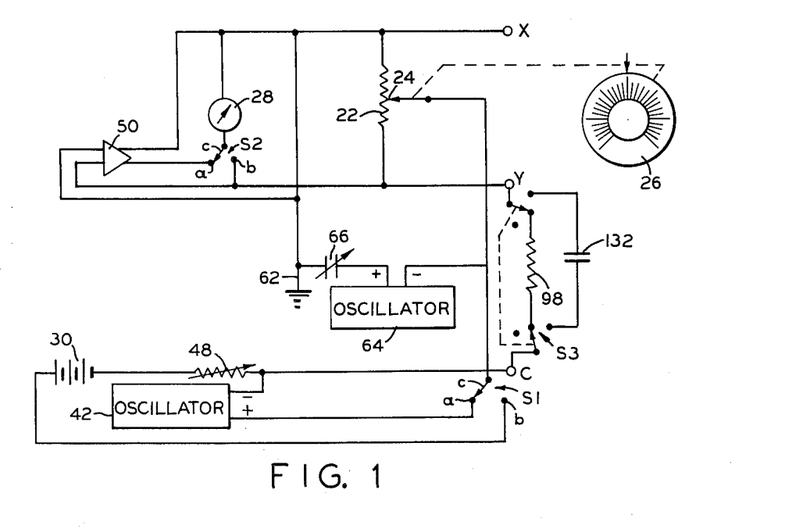
FIGURE 1 is a schematic diagram of a test set circuit adapted for fault location according to my invention.

Turing now to FIGURE 1, showing the test set in greater detail, the battery 30 is connected in series with a variable sensitivity adjusting resistor 48. Preferably, the generator 42 takes the form of an oscillator connected between the C terminal and contact $S1_a$ of a switch S1, while battery 30 is connected to a contact $S1_b$. The movable contact or wiper $S1_c$ of switch S1 is connected to the sliding tap 24 of potentiometer 22, and thus the excitation of the bridge circuit of which potentiometer 22 is a part may be changed from alternating to direct-current by proper setting of this switch.

The meter 28 is connected between the X terminal and the movable contact $S2_c$ of a switch S2. A contact $S2_b$ is connected to the Y terminal, and a contact $S2_a$ is connected to the output of an amplifier 50 whose input is derived from the voltage between the X and Y terminals. The X terminal is grounded to a chassis in the test set as indicated at 62, the latter being isolated from the actual earth ground. Illustratively, an oscillator 64, whose frequency is the same as that of generator 42, is connected in series with a capacitor 66 between the tap 24 and chassis ground 62. The amplifier 50 preferably includes a suitable rectifier so that the meter 28 connected to its output may be a direct current meter of suitable construction. Thus, with switches S1 and S2 in the positions shown in FIGURE 1, test set 20 is arranged as shown in simplified form in FIGURES 4 and 5, adapted for location of a break in a conductor. When the switches, which may be ganged for ease of manipulation, are in the other or "b" positions, the test set circuit of FIGURES 1 and 2 is achieved.

The purpose of oscillator 64 and capacitor 66 is to eliminate the effect of the capacitance between the test set and actual ground. Stray capicitances always exist between the test set chassis (and the X terminal connected thereto) and the earth, and also between the earth and the conductors connected to the C and Y terminals. In fact, the conductor 36 or 38 (FIGURES 4 and 5) may in some instances be the earth or cable armor in electrical contact therewith. Thus, there are resultant stray capacitances between the X terminal and the C and Y terminals. Referring to FIGURES 4 and 5, it is seen that the stray capacitance (not shown) between the X and Y terminals is across the entire potentiometer 22 and therefore does not effect balance of the measuring bridge circuit. However, the stray capacitance (not shown) between the X and C terminals is in parallel with the capacitance C1 and therefore will affect bridge balance and will result in inaccurate measurement of the ratio, $$\frac{C1}{C1+C2}$$

Returning to FIGURE 1, the oscillator 64 operates at the same frequency as oscillator 42 and in phase opposition therewith, as indicated by the polarity signs. Accordingly, oscillator 64 applies a signal between the X terminal and tap 24 in phase opposition to the current from generator 42 between these points through the stray capacitances. Capacitor 66 is adjusted so that the two currents are equal in magnitude, thereby cancelling the effect of such capacitances. In practice, I have found that capacitor 66 may be set in the factory and remain fixed thereafter in most applications. It will be apparent that oscillator 64 and generator 42 may be combined, so long as the respective outputs are isolated sufficiently from each other.

The capacitance cancelling feature of the test set 20 is also of importance in making certain measurements, other than those described above, wherein the test set is used as a straight capacitance bridge for more direct measurement of the capacitance ratios in a broken line. This latter type of measurement is often made where a line has two breaks, and the distance to one from one end of the line is known. Referring to FIGURES 4 and 5, it should be noted at this point that voltages will be induced by the excitation from the generator 42 in other conductors (not shown) capacitively coupled to those used in the measurements. However, these signals have no effect on the measurements taken with my system inasmuch as they are self-cancelling in nature.

The frequency of the generator 42 should be sufficiently low that reactances of the measured capacitances are substantially less than the resistances and self inductances of the conductors used in the measurements, but high enough to provide unbalance currents of a magnitude easily amplified to an acceptable level by the amplifier 50. Further, the frequency should be different from that of any stray spurious signals which may be picked up by the conductors used in the measurements, most notably, the standard power line frequency of 60 cycles per second and harmonics thereof. I have found that 100 cycles per second is a suitable excitation frequency in view of these factors. Moreover, when such spurious signals are received, means should be provided to differentiate them from the bridge unbalance signal; and, accordingly, earphones may be substituted for the meter 28 and the amplifier 50, whereby the operator may determine by ear when an actual bridge null is obtained.

Figure 6:
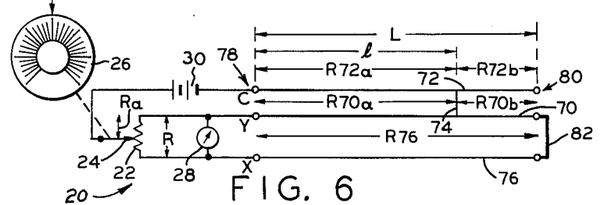
FIGURES 6 and 7 are simplified schematic circuit diagrams showing the operation of the test set of FIGURE 1 in locating a short circuit in a cable having three conductors.
Figure 7:
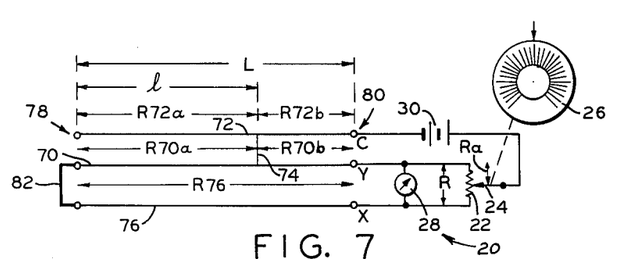

Referring now to FIGURES 6 and 7, a faulted conductor 70 is short circuited to another conductor 72 as indicated at 74. Conductor 72 may be in the same cable as conductor 70 or in another cable, or it may be a cable sheath or even ground. Furthermore, as stated above, the term "short circuit" includes resistive paths between the conductors. Another conductor 76 extends along the length L of the conductors 70 and 72 between a first location indicated at 78 and a second location indicated at 80. The measurement now to be described with reference to FIGURES 6 and 7 is adapted to determine the distance 1 from the first location 78 to the fault 74. The test set 20 utilizes the battery 30 for these measurements.

A first measurement is made by connecting the test set 20 at the first location 78 with the X terminal connected to conductor 76, the Y terminal connected to conductor 70 and the C terminal connected to conductor 72. Further a jumper T2 is connected between the conductors 70 and 76 at the second location 80, all as shown in FIGURE 6. These connections produce a bridge circuit having the portions of the potentiometer 22 on either side of the tap 24 as two of its arms; the portion of conductor 70 between the fault 74 and the first location 78 is a third arm; and the series combination of the portion of conductor 70 between fault 74 and the second location 80, the jumper 82 and the conductor 76 is the fourth bridge arm. When this bridge is brought to balance as indicated by a null on the meter 28, the reading of the dial 26 provides the information, $$\frac{R_a}{R}=\frac{R70a}{R70a+R70b+R76}=K \qquad (13)$$

Where,

R70a is the resistance of the section of conductor 70 between the Y terminal and the fault 74,
R70b is the resistance of the remainder of the conductor 70, and
R76 is the resistance of the conductor 76.

Referring now to FIGURE 7, the test set 20 is moved to the second location 80 and connected as shown for a second measurement. The jumper 82 is removed form the location 80 and connected at location 78 between the conductors 70 and 76. With the FIGURE 7 connections, the two portions of the potentiometer 22 on each side of the tap 24 are two arms of a bridge circuit; the section of conductor 70 between fault 74 and the second location 80 is a third arm; and the fourth arm comprises the series combination of the section of conductor 70 between the fault 74 and the first location 78, the jumper 82 and the conductor 76. When the bridge is balanced, dial 26 indicates, $$\frac{R_a}{R}=\frac{R70b}{R70a+R70b+R76}=P \qquad (14)$$

The fractional distance, l/L, of the fault 74 from the first location 78 is now readily obtained from the ratio, $$\frac{l}{L}=\frac{K}{K+P}=\frac{R70a}{R70a+R70b} \qquad (15)$$

Multiplication of the fraction on the right side of Equation 15 by the known length L of the faulted conductor 70 gives the actual distance l of the fault 74 from the first location 78 in the same units of length as the distance L is measured.

As with the foregoing tests, it is seen that only two readings of the test set 20 are required for locating the fault 74. The computation required to convert the readings into the location is elementary and readily calculated by a relatively unskilled operator. Moreover, this test requires only three conduction paths along the cable length L between the two locations.

Figure 8:
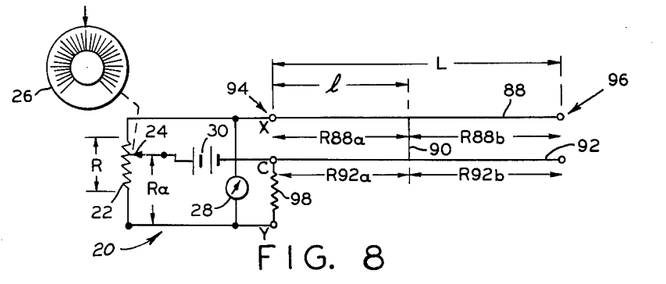
FIGURES 8 and 9 are simplified schematic circuit diagrams showing the operation of the test set of FIGURE 1 in locating a short circuit in a cable having two conductors.
Figure 9:
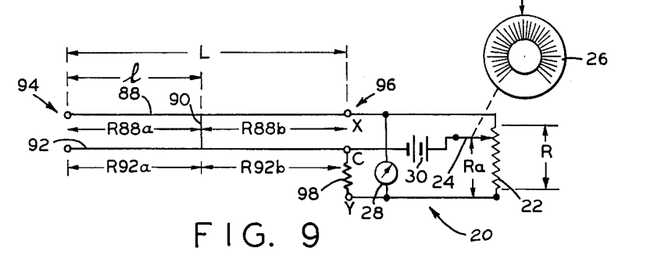

Continuing now with reference to FIGURES 8 and 9, there is shown a conductor 88 having a fault 90 in the form of a metallic short circuit to a conductor 92. The conductors 88 and 92 extend for a length L between first and second locations indicated generally at 94 and 96, respectively, and the distance $l$ of the fault 90 from the first location 94 will now be determined with the test set 20.

Note that only two conductors are required for the present measurment. This is made possible by connecting a resistor 98 between the test set terminals Y and C. The battery 30 is used in the test set 20 to provide a D.C. voltage to locate the fault 90 with the resistive impedances of the conductors 88 and 92 and the resistance of the resistor 98.

More specifically, as shown in FIGURE 8, for the first measurement the test set is connected at the first location 94 with the X terminal connected to conductor 88, and the common terminal connected to conductor 90. When the potentiometer tap 24 is now moved to obtain a null on the meter 28 the resultant bridge circuit is balanced and the potentiometer resistances are related to the conductor resistances by, $$\frac{R_a}{R}=\frac{R98}{R98+R88a+R92a}=K \qquad (16)$$

where,

R98 is the resistance of resistor 98,
R88$a$ is the resistance of the section of conductor 88 betwen the X terminal and the fault 90, and
R92$a$ is the resistance of the section of the conductor 92 between the C terminal and the fault 90.

To obtain the remaining information necessary to locate the fault 90, the test set 20 is moved to the second location 96 and the X terminal again connected to the conductor 88 and the C terminal connected to the conductor 92, all as shown in FIGURE 9. The potentiometer tap 24 is again adjusted to minimize the indication on the meter 28, at which point the dial 26 indicates, $$\frac{R_a}{R}=\frac{R98}{R98+R88b+R92b}=P \qquad (17)$$

where,

R88$b$ is the resistance of the section of the conductor 88 between the X terminal at the second location and the fault 90, and R92$b$ is the resistance of the section of the line 92 between the C terminal at the second location and the fault 90.

Using conventional algebra it can be shown that $$\frac{P(1-K)}{P(1-K)+K(1-P)}=\frac{R88a}{R88a+R88b} \qquad (18)$$

The right-hand side of the Equation 18 is the ratio of the resistance of section 88$a$ of the faulted conductor 88 to the resistance of the entire conductor 88. This resistance ratio is equal to the ratio $l/L$, and the distance can now be calculated by $$l=\frac{P(1-K)}{P(1-K)+K(1-P)}L \qquad (19)$$

The fault location test thus described with reference to FIGURES 8 and 9 is particularly suited to locating a metallic or other short circuit of substantially zero resistance. For greater accuracy the value of the resistor 98 is preferably selected so that the ratios K and P of Equations 16 and 17 both lie between 0.1 and 0.9. However, it is not necessary to know the actual resistance of the resistor 98.

This two-wire short circuit locating test thus provides a novel technique for locating a short circuit that requires only the two conductors that are shorted together. No additional conductors are required.

In many instances a fault such a a break or open circuit occurs in a cable of extremely long length or in a cable whose length is not known to a high degree of accuracy. In these instances, according to prior techniques, numerous successive measurements have been made in an effort to "zero in" on the break. However, this "zeroing in" approach often requires a great many measurements with a great number of cuts into the cable. This is extremely inefficient, especially where the cable is enclosed in a lead sheath or the like.

The test set 20 is suited for locating such faults with a single measurement made at a location intermediate the fault and an open termination on the faulted cable. In many instances, the cable sheath can be opened to provide such a test location where the cable has been previously opened and repaired. This is highly desirable since it is substantially easier and less costly to re-open a lead cable sheath at a location where it has been previously opened rather than to make a new break through the sheath.

Figure 10:
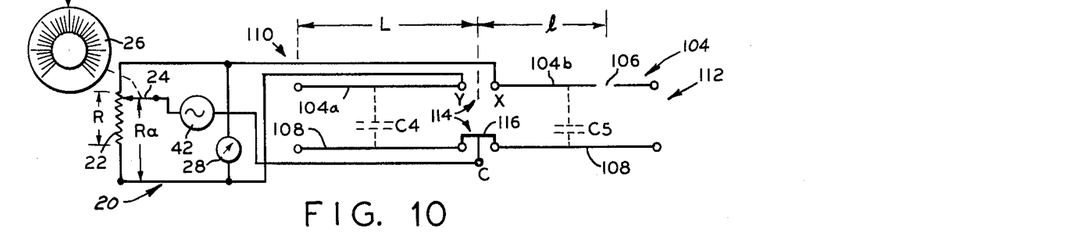
FIGURE 10 is a simplified schematic circuit diagram showing still another operation of the test set of FIGURE 1 in locating an open circuit.

This technique will now be explained with reference to FIGURE 10, where the conductor 104 has a fault 106 in the form of a break which causes an open circuit. Another conductor 108, which may be a shield, extends with the cable 104 between a first location indicated generally at 110 and a second location 112 beyond the fault 106. As stated above, the cable length between the locations 110 and 112 need not be known for locating the fault 106 according to the technique now to be described.

The test set 20, utilizing the generator 42 of alternating current, is connected to the conductors 104 and 108 by severing the conductors to form an opening 114 at an intermediate location. The test set Y terminal is connected to the potrion 104$a$ of conductor 104 between opening 114 (intermediate location) and first location 110 and the X terminal thereof is connected to the portion 104$b$ of conductor 104 between opening 114 and the fault 106. A jumper 116 connects the severed portions of the conductor 108 and the test set common terminal C is connected to the jumper, as shown in FIGURE 10.

This connection forms a bridge circuit with the test set potentiometer 22 providing two arms of the bridge and the capacitance C4 between conductor 108 and portion 104$a$ of conductor 104 (between the Y terminal and the first location 110) providing a third bridge arm. The capacitance C5 between conductor 108 and portion 104$b$ of conductor 104 (between the X terminal and fault 106) forms a fourth bridge arm. When the bridge is brought to balance, dial 26 indicates the value of the resistance ratio $R_a/R$ related to the interconductor capacitances by $$\frac{R_a}{R}=\frac{C5}{C4+C5}=A \qquad (20)$$

where A is the number read from the dial 26.
Since $$\frac{C5}{C4}=\frac{l}{L}$$

it can be shown that $$\frac{l}{L}=\frac{A}{1-A} \qquad (21)$$

The distance $l$ from the opening 114 to the fault 106 is readily determined by mutiplying the right side Equation 21 by the length L between the opening 114 and the first location 110.

Thus, according to the technique described above with reference to FIGURE 10, the present test set 20 has as a further use the location of a fault such as an open circuit or other high series impedance in a conductor where only one conductor in addition to the faulted conductor is available. The technique locates the fault with a single measurement made at an opening into the conductor at a known cable length from an open circuit termination of the faulted and other conductors.

In a manner similar to the two-conductor technique described above with reference to FIGURES 8 and 9 for locating a fault in the form of a short circuit between two conductors, the test set 20 can be used to locate a fault in the form of a high series impedance or an open circuit in a conductor. The test requires only one additional conductor besides the faulted conductor.

Figure 11:
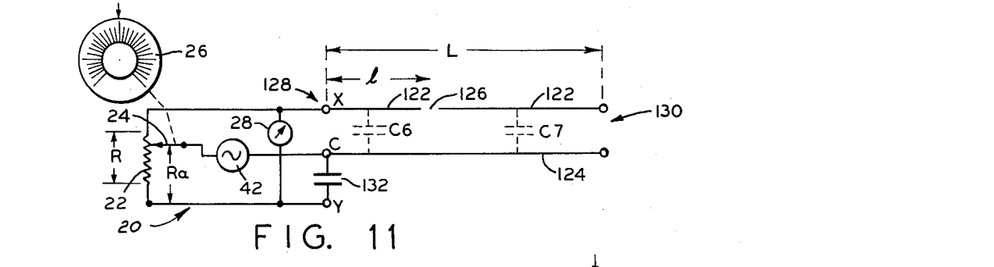
FIGURES 11 and 12 are simplified schematic circuit diagrams showing the operation of a test set of FIGURE 1 in locating an open circuit in a cable having two conductors.
Figure 12:
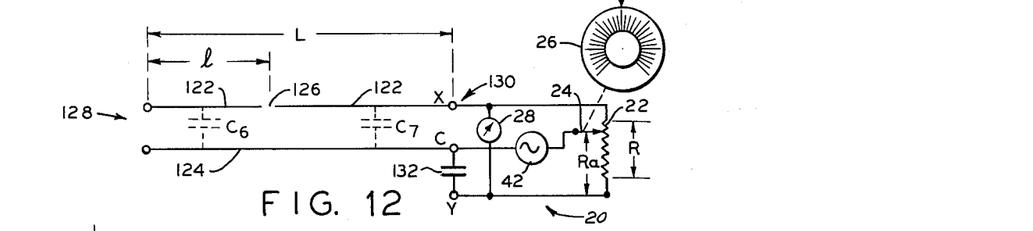

Specifically, as shown in FIGURES 11 and 12, the conductor 122, which may be in a two conductor cable with the conductor 124, has a fault 126 in the form of a break whose position it is desired to locate. The conductors 122 and 124 extend with a length L between two locations indicated generally at 128 and 130.

A first measurement, illustrated in FIGURE 11, is made by connecting the test set 20 at the location 128 with the X terminal connected to conductor 122 and the C terminal connected to conductor 124. The test set is switched to apply the alternating current from the generator 42 to the conductors and incorporates a capacitor 132 connected between the C and Y terminals. This arrangement provides a bridge circuit with the potentiometer 22 forming two arms thereof and the capacitances C6 and C7 between the portions of conductor 122 on each side of the fault 126 and the conductor 124 forming the other two bridge arms. The bridge is balanced by adjusting the position of the tap 24 on the potentiometer 22, and the value of the ratio $R_a/R$ is read from the scale 26. At balance this ratio is related to the interconductor capacitances by $$\frac{R_a}{R}=\frac{C6}{C6+C132}=P \quad (22)$$

where,

C6 is the capacitance between conductor 124 and the section of conductor 122 between the X terminal, location 128, and the fault 126, and C132 is the capacitance of capacitor 132.

A second measurement is made by connecting the test set, including the capacitor 132, to the conductors 122 and 124 at the location 130 in the manner shown in FIGURE 12. At balance, the dial indication is $$\frac{R_a}{R}=\frac{C7}{C7+C132}=K \quad (23)$$

where,

C7 is the capacitance between conductor 124 and the section of conductor 122 between the X terminal, location 130, and the fault 126.

It can be shown that the ratio $l/L$ is equal to the ratio of capacitance C6 over the sum of the capacitances C6 and C7; which is related to the P and the K values, of Equations 22 and 23, as indicated in Equation 29

$$\frac{l}{L}=\frac{C6}{C6+C7}=\frac{P(1-K)}{P(1-K)+K(1-P)} \quad (24)$$

The location of the fault 126 from the location 128 can now be rapidly determined by multiplying the right-hand side of the Equation 29 by the cable length L between the locations 128 and 130.

To obtain the greatest available accuracy, the value of the capacitor 132 is preferably chosen so that the P and K values each are between 0.1 and 0.9. However, it is not necessary to know the actual value of the capacitor 132.

The versatility of the test set 20 in locating other cable faults will now be described with reference to FIGURE 13, wherein the test set is used to located where in a cable indicated at 137 two conductors from different pairs thereof have become crossed, forming what is commonly known as a split pair.

The conductors 138 and 140 are the crossed conductors, being "split" at a fault 139. Conductor 138 is intended to be paired with a conductor 142 forming a conductor pair 141. Similarly, conductor 140 is intended to be paired with a conductor 144 to form a conductor pair 143. A third conductor pair 148 comprising the conductors 150 and 152, extends with the other pairs between the two locations 154 and 156 for a cable length L. The distance $l$ of the fault 139 from the location 154 is determined by the same principles incorporated in the tests and techniques explained above; to wit, providing a ratio of the impedance of the section of the faulted conductor to the impedance of the entire faulted conductor.

In the present instance, the conductor 138 is considered to be the faulted conductor and the distance $l$ will be determined by determining the ratio of C9, the capacitance between conductor 142 and the section of conductor 138 between the fault 139 and the location 154 to the sum of the capacitance C9 plus the capacitance C10 between conductor 142 and the section of conductor 140 between the fault 139 and location 156.

Figure 13:
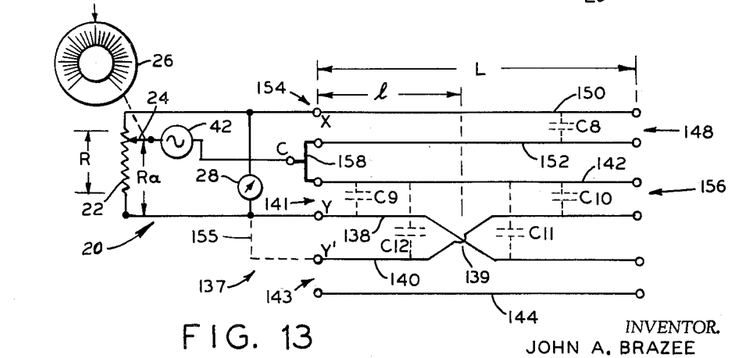
FIGURE 13 is a simplified schematic circuit diagram showing the operation of a test set of FIGURE 1 in locating a split pair in a multiple pair electrical cable.

Specifically, as shown in FIGURE 13, a jumper 158 is connected at the first location 154 between the conductors 152 and 142 and further connected to the test set C terminal.

The test set terminals X and Y are connected respectively to the conductors 150 and 138. The third and fourth arms of the bridge circuit thus produced are, respectively, the capacitances C8 between the conductors 150 and 152 and the sum of the capacitances C9 and C11, where, C11 is the capacitance between conductor 142 and the section of conductor 138 between fault 139 and location 156.

When the bridge is balanced, the relation of these capacitances to the raio of the potentiometer resistances is $$\frac{R_a}{R}=\frac{C8}{C8+C9+C11}=P \quad (25)$$

A second measurement is made after the Y terminal of the test set 20 is removed from the conductor 138 and connected to the conductor 140 at the location 154. This connection is indicated in FIGURE 13 with the dashed line 155 and the terminal Y'. The connections of the X terminal and the C terminal and the jumper 158 remain the same as for the first measurement. The ratio of the potentiometer resistances when this bridge circuit is balanced is $$\frac{R_a}{R}=\frac{C8}{C8+C12+C10}=K \quad (26)$$

where,

C12 is the capacitance between conductor 142 and the section of conductor 140 between the fault 139 and location 154.

In a cable having the pairs 141, 143 and 148 constructed with similar gauge wires and similar insulation, it may be assumed that $$C8=C9+C10 \quad (27)$$

and $$\frac{C12}{C11+C12}=\frac{C9}{C10+C9} \quad (28)$$

Applying these assumptions to Equations 25 and 26 it can be shown that $$\frac{l}{L}=\frac{C9}{C9+C10}=\frac{2PK-P}{4PK-K-P} \quad (29)$$

The distance of the fault 139 from the location 154 can now be readily calculated by multiplying the right-hand side of Equation 29 by the distance L between the locations 154 and 156.

The techniques described above with reference to FIGURES 2, 3, 4 and 5 for locating faults in cables of mixed gauges are equally applicable to the techniques described above with reference to FIGURES 6–13.

Referring again to FIGURE 1, the resistor 98 used in the test shown in FIGURES 8 and 9 and the capacitor 132 used in the tests described with reference to FIGURES 11 and 12 may be incorporated in the test set with a three-position switch S3 having two sections ganged together to connect either the resistor 98 or the capacitor 132 between the terminals C and Y. In a third position, neither element is connected between the two terminals. To provide the preferred ranges of the ratio of the potentiometer 22 resistance $R_a/R$ when the measuring bridges are balanced, as discussed above with reference to FIGURES 8, 9, 11 and 12, the resistor 98 and the capacitor 132 may be variable.

Thus, I have described an improved system for locating faults in electrical conductors. The faults are located by comparing an impedance of the section of the faulted line between the fault and the test set to the impedance of the entire line, thereby affording a high degree of accuracy. Where the fault is a short circuit or similar failure, the impedance utilized is the electrical resistance of the line, and where the fault is a break or other failure having a like effect, the impedance utilized is the capacitance between the conductor and other conductors extending parallel thereto. In either case, but two measurements are required, and in many instances both of these are from the same end of the line. From the readings obtained, the fractional distances of the faults from the measured ends of the faulted lines may easily be computed. The method is thus susceptible of practice by relatively untrained, unskilled personnel. Moreover, the apparatus described above is simple in nature and of relatively low cost construction while providing accuracy of fault locating, including compensation for stray capacitances. It is easy to set up in the field and simple to operate.

Further, it will be noted that the only high precision component in the test set 20 is the potentiometer 22, whereas in prior instruments, precision resistors of both a fixed and variable nature were required. It is well known that a high precision potentiometer, providing a voltage or resistance ratio rather than an actual resistance value, is much less costly to construct and calibrate than a variable resistor of the same precision.

A further feature of many of the tests is that they are suited for locating faults in cables having few conductors; location of open circuit faults requires only one conductor in addition to the faulted one, and short-circuit faults may be located using only the two shorted conductors.

It will thus be seen that the objects set forth above, among those made apparent from the preceding description are efficiently attained, and since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described by invention, what I claim as new and desire to secure by Letters Patent is:

1. The method of locating a fault in the form of a break or the like in a faulted conductor by determining its distance from a known location where said faulted conductor extends together with a good conductor between said fault and a first location, said faulted conductor having a first portion extending for a known distance between said first location and in intermediate location between said fault and first location, and having a second portion extending for an unknown distance between said fault and said intermediate location, said method locating said fault from said intermediate location and comprising the steps of A. connecting said faulted and good conductors, at said intermediate location, with two relatively inversely-variable impedance elements to form a bridge circuit having a different one of said elements in each of two arms and having a first capacitance between said first portion and said good conductor in a third arm and having a second capacitance between said second portion and said good conductor in a fourth arm, so that at balance said bridge circuit provides a measure of ratio of said first capacitance to said second capacitance, and B. evaluating said ratio, on the basis that said first capacitance is proportional to said known distance and that said second capacitance is equally proportional to said unknown distance, to determine said unknown distance.

2. A method of locating a fault in the form of a break or the like in a faulted conductor by determining its distance from a known location where said faulted conductor extends together with a good conductor between said fault and a first location, said faulted conductor having a first portion extending for a known distance between said first location and an intermediate location between said fault and first location, and having a second portion extending for an unknown distance between said fault and intermediate location, said method locating said fault from said intermediate location and comprising the steps of A. connecting the end terminals of a voltage divider between said first conductor portion and said second conductor portion at said intermediate location, B. connecting a source of alternating voltage between said good conductor and a tap movable on said voltage divider intermediate said end terminals, the connection to said good conductor being at said intermediate location, C. connecting voltage indicating means between the end terminals of said voltage divider, D. providing a scale on said voltage divider coupled with said tap for indicating the proportion of the total resistance of said voltage divider between said end terminals thereof which is between said tap and one end terminal of said voltage divider, thereby providing a bridge circuit that at balance indicates on said scale the numerical value of said proportion, E. equating the ratio of said unknown distance to said known distance to the ratio of said numerical value to $(10^n)$ minus said numerical value, where $n$ is an integer including zero, and F. evaluating the equation to determine said unknown distance.

3. In the location of a cable fault by determining the distance of the fault from a known location along said cable, said fault being in the form of a break or relatively high series resistance in a faulted conductor extending together with a good conductor between the fault and a first location, the steps of A. interrupting said faulted conductor at an intermediate location between said first location and said fault, so that a first portion of said faulted conductor extends for a known distance between said first and intermediate locations and a second portion of said faulted conductor extends for an unknown distance between said intermediate location and said fault, B. at said intermediate location
   (1) connecting two series-connected relatively inversely-variable impedance elements between said first and second conductor portions, (2) connecting a first device, selected from an electrical source and an electrical detector, between said good conductor and the connection between said impedance elements, and (3) connecting the other of said devices between said portions of said faulted conductor to be in parallel with said series-connected impedance elements, C. thereby forming a bridge circuit wherein at balance the ratio of the impedances of said impedance elements is equal to the ratio of said known and unknown distances, and D. evaluating said ratios to determine said unknown distance.

4. The method defined in claim 3 comprising the further step of coupling impedance ratio-measuring means to said impedance elements, said measuring means indicating the numerical value of the ratio of the resistance of a first of said elements to the total series resistance of both of said elements.

5. The method defined in claim 3

A. comprising the further step of coupling impedance ratio indicating means to said impedance elements, said indicating means indicating the numerical value, between (0) and ($10^n$) where $n$ is an integer including zero, of the ratio of the resistance of a first of said elements to the total series resistance of both said elements, and B. in which said ratio evaluation step comprises the step of equating the ratio of said numerical value to ($10^n$) minus said value to the ratio of said unknown to known distances, thereby to determine said unknown distance.

6. In apparatus for locating a cable fault by determining the distance of the fault from a known location, said fault being in the form of a break or relatively high series resistance in a faulted conductor extending together with a good conductor between the fault and a first location, the combination of A. a potentiometer having first and second end terminals and a tap movable between said end terminals, (1) said potentiometer end terminals being connected, at an intermediate location between said first location and said fault, between a first portion of said faulted conductor extending for a known distance between said first location and said intermediate location and a second portion of said faulted conductor extending for an unknown distance between said fault and said intermediate location, B. a source of alternating voltage connected between said tap and said good conductor at said intermediate location, and C. a voltage indicator connected between said end terminals of said potentiometer.

7. The combination defined in claim 6 further comprising readout means indicating the ratio of the resistance of said potentiometer between said tap and one end terminal thereof to the total resistance of said potentiometer between said end terminals.

References Cited by the Examiner

UNITED STATES PATENTS 3,004,216   10/1961   Hauf _______________ 324—52

WALTER L. CARLSON, *Primary Examiner.*